(12) United States Patent
Whitten et al.

(10) Patent No.: US 7,811,174 B2
(45) Date of Patent: Oct. 12, 2010

(54) METHOD AND APPARATUS FOR MANAGING DATA IN A GAMING SYSTEM

(75) Inventors: Jon Marcus Randall Whitten, Sammamish, WA (US); Christopher M. Pirich, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1143 days.

(21) Appl. No.: 11/082,457

(22) Filed: Mar. 17, 2005

(65) Prior Publication Data

US 2005/0164782 A1 Jul. 28, 2005

Related U.S. Application Data

(62) Division of application No. 09/802,797, filed on Mar. 9, 2001, now abandoned.

(51) Int. Cl.
- A63F 9/24 (2006.01)
- A63F 13/00 (2006.01)
- G06F 17/00 (2006.01)
- G06F 19/00 (2006.01)

(52) U.S. Cl. .............. 463/43; 463/9; 463/30; 463/31; 463/36; 463/42; 700/91; 705/25; 709/205

(58) Field of Classification Search .............. 463/43
See application file for complete search history.

(56) References Cited

U.S. PATENT DOCUMENTS

| | | | |
|---|---|---|---|
| 4,296,476 A | 10/1981 | Mayer et al. | |
| 4,432,067 A | 2/1984 | Nielsen | |
| 4,858,930 A * | 8/1989 | Sato | 463/23 |
| 4,905,280 A | 2/1990 | Wiedemer | |
| 5,359,510 A | 10/1994 | Sabaliauskas | |
| 5,362,068 A | 11/1994 | Liu | |
| 5,382,983 A | 1/1995 | Kwoh et al. | |
| 5,421,590 A * | 6/1995 | Robbins | 463/37 |
| 5,459,487 A | 10/1995 | Bouton | |
| 5,465,982 A | 11/1995 | Rebane | |
| 5,475,835 A | 12/1995 | Hickey | |
| 5,489,103 A | 2/1996 | Okamoto | |
| 5,539,822 A | 7/1996 | Lett | |

(Continued)

FOREIGN PATENT DOCUMENTS

CA 2201276 9/1998

(Continued)

OTHER PUBLICATIONS

Links 386CD Players Manual, Access Software, Inc. (1995), pp. 1-87.*

(Continued)

*Primary Examiner*—John M. Hotaling, II
*Assistant Examiner*—Paul A. D'Agostino (57) ABSTRACT

A gaming system includes a hard disk drive for storing applications and other data. The hard disk drive has multiple regions for storing different types of data. Each application executed on the gaming system has an associated storage area on the hard disk drive. A console application executing on the gaming system prevents a particular application from accessing data in an area of the hard disk drive that is not associated with the particular application. The gaming system also maintains a list of recently used nicknames to simplify entry of nicknames by a user of the gaming system.

13 Claims, 8 Drawing Sheets

U.S. PATENT DOCUMENTS

| | | | |
|---|---|---|---|
| 5,550,575 A | 8/1996 | West et al. | |
| 5,551,701 A | 9/1996 | Bouton et al. | |
| 5,556,107 A | 9/1996 | Carter | |
| 5,557,541 A | 9/1996 | Schulhof et al. | |
| 5,558,339 A | 9/1996 | Perlman | |
| 5,587,546 A | 12/1996 | Kato et al. | |
| 5,592,609 A | 1/1997 | Suzuki et al. | |
| 5,592,651 A | 1/1997 | Rackman | |
| 5,598,276 A | 1/1997 | Cookson et al. | |
| 5,611,066 A | 3/1997 | Keele et al. | |
| 5,624,316 A | 4/1997 | Roskowski et al. | |
| 5,630,754 A * | 5/1997 | Rebane | 463/9 |
| 5,634,849 A | 6/1997 | Abecassis | |
| 5,649,862 A | 7/1997 | Sakaguchi et al. | |
| 5,659,742 A | 8/1997 | Beattie et al. | |
| 5,680,323 A | 10/1997 | Barnard | |
| 5,706,510 A | 1/1998 | Burgoon | |
| 5,711,715 A | 1/1998 | Ringo et al. | |
| 5,716,273 A | 2/1998 | Yuen | |
| 5,726,909 A | 3/1998 | Krikorian | |
| 5,735,744 A | 4/1998 | Okamoto | |
| 5,745,574 A | 4/1998 | Muftic | |
| 5,746,656 A | 5/1998 | Bezick et al. | |
| 5,752,883 A | 5/1998 | Butcher et al. | |
| 5,791,992 A | 8/1998 | Crump et al. | |
| 5,797,752 A | 8/1998 | Umezawa | |
| 5,798,921 A | 8/1998 | Johnson et al. | |
| 5,807,174 A * | 9/1998 | Fukuhara et al. | 463/31 |
| 5,807,175 A * | 9/1998 | Davis et al. | 463/36 |
| 5,841,979 A | 11/1998 | Schulhof et al. | |
| 5,876,286 A | 3/1999 | Lee | |
| 5,878,134 A | 3/1999 | Handelman et al. | |
| 5,892,900 A | 4/1999 | Ginter et al. | |
| 5,896,125 A | 4/1999 | Niedzwiecki | |
| 5,915,238 A | 6/1999 | Tjaden | |
| 5,917,256 A | 6/1999 | Broadbent, II | |
| 5,918,223 A | 6/1999 | Blum et al. | |
| 5,933,599 A | 8/1999 | Nolan | |
| 5,935,005 A | 8/1999 | Tsuda et al. | |
| 5,946,278 A | 8/1999 | Tower | |
| 5,961,386 A * | 10/1999 | Sawaguchi | 463/43 |
| 5,969,283 A * | 10/1999 | Looney et al. | 84/609 |
| 5,973,683 A | 10/1999 | Cragun et al. | |
| 5,978,920 A | 11/1999 | Lee | |
| 5,980,261 A | 11/1999 | Mino et al. | |
| 5,993,319 A | 11/1999 | Aoyama | |
| 6,001,015 A * | 12/1999 | Nishiumi et al. | 463/38 |
| 6,005,597 A | 12/1999 | Barrett et al. | |
| 6,009,433 A | 12/1999 | Kurano et al. | |
| 6,011,758 A | 1/2000 | Dockes et al. | |
| 6,012,068 A | 1/2000 | Boezeman et al. | |
| 6,015,344 A | 1/2000 | Kelly et al. | |
| 6,025,869 A | 2/2000 | Stas et al. | |
| 6,031,795 A | 2/2000 | Wehmeyer | |
| 6,043,818 A | 3/2000 | Nakano et al. | |
| 6,065,020 A | 5/2000 | Dussud | |
| 6,082,887 A * | 7/2000 | Feuer et al. | 700/91 |
| 6,093,880 A | 7/2000 | Arnalds | |
| 6,099,408 A | 8/2000 | Schneier et al. | |
| 6,115,079 A | 9/2000 | McRae | |
| 6,119,116 A | 9/2000 | Rose | |
| 6,122,617 A | 9/2000 | Tjaden | |
| 6,128,255 A | 10/2000 | Yankowski | |
| 6,128,625 A | 10/2000 | Yankowski | |
| 6,147,696 A * | 11/2000 | Smith et al. | 345/533 |
| 6,147,940 A | 11/2000 | Yankowski | |
| 6,161,185 A | 12/2000 | Guthrie et al. | |
| 6,181,336 B1 | 1/2001 | Chiu et al. | |
| 6,186,896 B1 * | 2/2001 | Takeda et al. | 463/38 |
| 6,189,096 B1 | 2/2001 | Haverty | |
| 6,192,340 B1 | 2/2001 | Abecassis | |
| 6,224,485 B1 * | 5/2001 | Dickinson et al. | 463/30 |
| 6,230,320 B1 | 5/2001 | Gakumura | |
| 6,251,012 B1 | 6/2001 | Horigami et al. | |
| 6,280,327 B1 | 8/2001 | Leifer et al. | |
| 6,280,329 B1 | 8/2001 | Kondo et al. | |
| 6,285,381 B1 * | 9/2001 | Sawano et al. | 715/726 |
| 6,298,441 B1 | 10/2001 | Handelman et al. | |
| 6,299,535 B1 | 10/2001 | Tanaka | |
| 6,309,301 B1 | 10/2001 | Sano | |
| 6,312,336 B1 | 11/2001 | Handelman et al. | |
| 6,320,320 B1 | 11/2001 | Bailey, III et al. | |
| 6,338,680 B1 * | 1/2002 | Connors | 463/43 |
| 6,352,479 B1 * | 3/2002 | Sparks, II | 463/42 |
| 6,383,079 B1 * | 5/2002 | Takeda et al. | 463/43 |
| 6,386,979 B1 * | 5/2002 | Ho et al. | 463/43 |
| 6,386,980 B1 | 5/2002 | Nishino et al. | |
| 6,393,430 B1 | 5/2002 | Van Ryzin | |
| 6,396,531 B1 * | 5/2002 | Gerszberg et al. | 348/14.01 |
| 6,439,956 B1 | 8/2002 | Ho | |
| 6,461,242 B2 * | 10/2002 | Takeda et al. | 463/38 |
| 6,464,585 B1 | 10/2002 | Miyamoto et al. | |
| 6,468,160 B2 | 10/2002 | Eliott | |
| 6,482,092 B1 * | 11/2002 | Tajiri et al. | 463/43 |
| 6,488,508 B2 | 12/2002 | Okamoto | |
| 6,502,111 B1 | 12/2002 | Dussud | |
| 6,520,890 B2 | 2/2003 | Hsu | |
| 6,535,269 B2 | 3/2003 | Sherman et al. | |
| 6,599,194 B1 | 7/2003 | Smith et al. | |
| 6,601,171 B1 | 7/2003 | Carter et al. | |
| 6,676,520 B2 * | 1/2004 | Nishiumi et al. | 463/37 |
| 6,712,704 B2 | 3/2004 | Eliott | |
| 6,714,189 B2 * | 3/2004 | Collins | 345/163 |
| 6,745,236 B1 | 6/2004 | Hawkins et al. | |
| 6,769,989 B2 | 8/2004 | Smith et al. | |
| 6,821,205 B2 | 11/2004 | Takahashi et al. | |
| 6,875,021 B2 | 4/2005 | Okamoto | |
| 6,928,433 B2 | 8/2005 | Goodman et al. | |
| 6,935,952 B2 | 8/2005 | Walker et al. | |
| 7,019,205 B1 | 3/2006 | Fujisawa et al. | |
| 7,198,490 B1 | 4/2007 | Olsen | |
| 7,240,093 B1 * | 7/2007 | Danieli et al. | 709/205 |
| 7,303,476 B2 | 12/2007 | Blanco | |
| 7,433,832 B1 * | 10/2008 | Bezos et al. | 705/26 |
| 7,708,643 B2 | 5/2010 | Allard | |
| 2001/0004609 A1 | 6/2001 | Walker et al. | |
| 2001/0007824 A1 | 7/2001 | Fukuda | |
| 2002/0059114 A1 | 5/2002 | Cockrill et al. | |
| 2002/0077177 A1 | 6/2002 | Elliott | |
| 2002/0082067 A1 * | 6/2002 | Mckay et al. | 463/9 |
| 2002/0121297 A1 | 9/2002 | Li et al. | |
| 2002/0152377 A1 | 10/2002 | Bauman | |
| 2003/0008715 A1 | 1/2003 | Huber et al. | |
| 2003/0077557 A1 | 4/2003 | Okamoto | |
| 2003/0078097 A1 | 4/2003 | Okamoto | |
| 2003/0227473 A1 | 12/2003 | Shih et al. | |
| 2004/0005924 A1 | 1/2004 | Watabe et al. | |
| 2004/0162137 A1 | 8/2004 | Eliott | |
| 2008/0045337 A1 | 2/2008 | Blanco | |

FOREIGN PATENT DOCUMENTS

| | | |
|---|---|---|
| DE | 10046437 | 4/2002 |
| EP | 0809214 | 11/1997 |
| EP | 0889420 | 1/1999 |
| EP | 0998966 | 5/2000 |
| EP | 1035706 | 9/2000 |
| EP | 1126425 | 8/2001 |
| FR | 2743434 | 7/1997 |
| GB | 2276971 | 10/1994 |
| JP | 3135636 | 6/1991 |
| JP | 7160467 | 6/1995 |
| JP | 7249283 | 9/1995 |
| JP | 8016554 | 1/1996 |

| | | |
|---|---|---|
| JP | 10243015 | 9/1998 |
| JP | 10327147 | 12/1998 |
| JP | 11-000468 | 1/1999 |
| JP | 11207034 | 8/1999 |
| JP | 11237941 | 8/1999 |
| JP | 11317061 | 11/1999 |
| JP | 2000107449 | 4/2000 |
| JP | 2000149386 | 5/2000 |
| JP | 2000157724 | 6/2000 |
| JP | 2000218035 | 8/2000 |
| JP | 2000228051 | 8/2000 |
| JP | 2000511378 | 8/2000 |
| JP | 2000511378 T | 8/2000 |
| JP | 2000348466 | 12/2000 |
| WO | WO9714151 | 4/1997 |
| WO | WO 98/56179 | 12/1998 |
| WO | WO0033572 | 6/2000 |
| WO | WO 00/40027 | 7/2000 |
| WO | WO 00/51036 | 8/2000 |
| WO | WO0051036 | 8/2000 |
| WO | WO 01/05477 A2 | 1/2001 |
| WO | WO 01/08148 | 2/2001 |
| WO | WO 01/84768 | 11/2001 |
| WO | WO-0183055 | 11/2001 |
| WO | WO0184768 | 11/2001 |
| WO | WO-2006033941 | 3/2006 |

OTHER PUBLICATIONS

"Tony Hawk Pro Skater 2: FAQ/Walkthrough", <http://www.gamefaqs.com/computer/doswin/file/258826/9219>, (Apr. 2001),154 pages.
Jones: "Garbage Collection", pp. 171-173: InterGenerational Points.
User Manual "Metropolis Street Racer" game 2000 18 pages.
Web page printout Nov. 13, 2000 Review of "Metropolis Street Racer" game 5 pages.
Links 386CD, 1995 Access Software Inc. pp. 1-87.
"Interviews—John Gildred of Indrema on the L600" Planet GeForce Interview by Christopher "Razor" Gordon Oct. 19, 2000 5 pages.
"Indrema: Linux-Based Console" CNET Gamecenter.com Aug. 11, 2000 2 pages.
"Linux fuels game console plus" ZDNetUK News Linux Devices. com Special to ZDNet Jul. 7, 2000 3 pages.
"US version of Playstation2 to have modem hard drive" By Bloomberg News Apr. 14, 2000 2 pages.
"IGN64's Ultimate 64DD FAQ—Everything you ever wanted to know about the upcoming disk drive add-on" Updated: 12/13 Dec. 15, 1999 12 pages.
"The 64DD Connection—Here's how the 64DD and the Nintendo 64 connect" Oct. 20, 1999 5 pages.
"The 64DD: Nintendo's Disk Drive—Everything you ever wanted to know about the N64's first major add-on" Jan. 28, 1997 7 pages.
"What is the 64DD?" Sep. 17, 1997 9 pages.
Press Pass "Xbox to Deliver Ultimate Console Gaming Experience" San Jose Ca Mar. 10, 2000 3 pages 2001.
"Microsoft goes gaming. (product Development)" Electronic Business May 200 2 pages.
"Play Back Media Your Way" PC World 'Online! Jun. 1, 2000 Retrieved form the Internet: url:http://www.pcworld.com/resource/printable/0aid1700100.asp. retrieved on Jul. 8, 2004.
"Windows Media Player 7 reviewed" Winsupersite 'Onlilne! Aug. 15, 2000 Retireved formt he internet: URL:http://www.winsupersite.com/reviews/wmp7.asp> retrieved on Jun. 18, 2004.
"CES: Bill Gates zeigt die Xbox" Golem.de 'Online! Jan. 6, 2000 Retrieved from the internet: url:http://dyn1.golem.de/cgi-bin/usisapi.dl1/forprint??id11561> retrieved Jun. 18, 2004.
"PlayStation 2 Instruction Manual" 'Online! 2000 Sony Computer Entertainment Retrieved from the internet: url:www.playstation.com. retrieved on Jun. 18, 2004.
PS2 Frequently Asked Questions' All Playstation2 'Online! Jul. 29, 2000 Retrieved from the Internet: URL:http://www.allps2.net/ps2_faq.html> retrieved on Jun. 18, 2004.

"Sony PlayStation 2" The Digital Bits 'Online! Nov. 15, 2000 retrieved from the internet: URL:http://www.thedigitalbits.com/reviews/ps2/sonyps2*.html> retrieved on Jun. 18, 2004.
Cryptography and network security: Principles and Practice Second Edition Prentice Hall 1999; pp. 330 and 333-338.
Quinlan, Daniel. "Filesystem Hierarchy Standard—Version 2.0", Online Oct. 26, 1997, Retrieved from URL:http://www.lisoleg.net/lisoleg/fs/fhs.pdf, retrieved Nov. 18, 2004.
"Dex Drive Manual" gameshark, Online! 1998, pp. 1-15, Retrieved from URL:http://www.angelfire.com/games/winospsxdexdrive/dexdrive.pdf.
"DFU Verbindung herstellen" FAQ, Online! XP002318226 Retrieved from the Internet: URL: www. puretec.de> 'retrieved on 2000! *whole document*.
Sherman S A et al.: "Secure Network Access Using Multiple Applications of AT&T's Smart Card" AT&T Technical Journal, American Telephone and Telegraph Co. New York, US, vol. 73, No. 5. Sep. 1, 1994, pp. 61-72, XP000475912 ISSN: 8756-2324 *p. 67*.
"The 64DD: Nintendo's Disk Drive", (Jan. 28, 1998).
Bolosky, et al., "Single Instance Storage in Windows 2000", Usenix Association, Proceedings of the 4th USENIX Windows Systems Syposium, Aug. 3-4, 2000, Seattle, WA, 15 pages.
Sega of America, Inc., ""The Game Manual Sega Dreamcast"", www.sega.com, 30 pages.
Hall et al., "Remote Electronic Gambling" Computer Security Applications Conference, 1997. Proceedings., 13th Annual Dec. 8-12, 1997 pp. 232-238.
Jimbo et al., "Optimal Authentication Systems and Combinatorial Designs" Information Theory, IEEE Transactions on vol. 36, Issue 1, Jan. 1990 pp. 54-62.
Nacira et al., "Secured Net-Banking by /spl thera/-VIGENERE in Syverson's Protocol" Computer Systems and Applications, 2005. The 3rd ACS/IEEE International Conference on 2005. p. 67.
"TV Incapable of Displaying Images", Nikkei Electronics, May 22, 2000 Issue, Japan, Nikkei Business Publications, Inc., May 22, 2000, No. 770, pp. 141-158.
"PlayStation 2, Dreamcast, and 64DD: Aiming at Increasing Customers by Integration with the Net", Nikkei Trendy, No. 169, Japan, Nikkei Home Publishing Inc., Jul. 25, 2000, Extra Edition/Serial No. 169, pp. 16-19.
"XBOX, ASCII, the March issue, 2001 (The Anatomy of XBOX which is Inaccessable to the Readers of Game Magazines: The Latest Information of the War for TV Viewers at Present Stage in 21st Century", ASCII Corporation., Mar. 1, 2001, vol. 25, No. 3, pp. 249-264.
"Real time incorporation of personalized audio into video game", U.S. Appl. No. 60/201,163, filed May 2, 2000.
""The 64DD: Nintendo's Disk Drive"", ign.com, (Jan. 28, 1998).
"IGN64's Ultimate 64DD FAQ", ign.com, (Dec. 15, 1999).
""What is the 64DD?"", ign.com, (Sep. 17, 1997).
"User Manual "Metropolis Street Racer"", www.replacementdocs.com, (Jul. 9, 2006).
"Review of "Metropolis Street Racer"", dailyradar.com, (Nov. 13, 2000).
Schneier, B. "Applied Cryptography". Applied Cryptography. Protocols, Algorithms and Source Code in C, New York. John Wiley & Sons, US, 1996. pp. 574-577.
"Metropolis Street Racer", retrieved at <<http://en.wikipedia.org/wiki/Metropolis_Street_Racer>>, on Jul. 9, 2006, Sega, Jan. 17, 2001, pp. 3.
Schneier. "Applied Cryptography," John Wiley & Sons. Second Edition. 1996. pp. 32 and 33.
Microsoft Help and Support, "Control Panel Options", http://support.microsoft.com/kb/835644/en-us, (Jul. 8, 2008).
Microsoft, "More than 200 PC Manufacturers Deliver Windows 98on New Consumer Machines", http://www.microsoft.com/presspass/press/1998/jun98/availpr.mspx, (Jun. 25, 1998).
Bolosky et al., "Single Instance Storage in Windows 2000" Proceedings of the Usenix Windows Systems Symposium, vol. 4, Aug. 3, 2000, pp. 13-21.
"Sega Dreamcast User Manual", retrieved on Oct. 16, 2006 at <<http://www/gamemanuals.net/download/

11eed12c65503f83e99b0c58bd7450bd/Dreamcast_(EN)_[Hardware].pdf>>, The Game Manual, Sep. 9, 1999, pp. 2-31.

"Non Final Office Action", U.S. Appl. No. 10/609,266, (Jun. 19, 2009),11 pages.

"Non-Final Office Action", U.S. Appl. No. 11/082,453, (Aug. 12, 2009),9 pages.

"DFU Verbindung herstellen FAQ Online", Retrieved from: <www.puretec.de> on 2000, XP002318226,(2000),2 pages.

"Non-Final Office Action", U.S. Appl. No. 11/082,452, (Feb. 4, 2010),15 pages.

"Notice of Allowance", U.S. Appl. No. 10/609,266, (Dec. 15, 2009),7 pages.

"Supplemental Notice of Allowance", U.S. Appl. No. 10/609,266, (Mar. 29, 2010),5 pages.

Jones, et al., "Garbage Collection: Algorithms for Automatic Dynamic Memory Management, Inter-Generational Pointers", *Book*, (Sep. 17, 1996),pp. 171-173.

Takahashi, Dean "Microsoft goes gaming, (product Development)", *Electronic Business*, (May 1, 2000),2 pages.

"Foreign Office Action", U.S. Appl. No. 2002-064294, (Apr. 20, 2010),11 pages.

"BPAI Decision", U.S. Appl. No. 09/802,504, (Feb. 19, 2009),10 pages.

"Non final Office Action", U.S. Appl. No. 11/082,452, (Feb. 11, 2009),38 pages.

"Non Final Office Action", U.S. Appl. No. 10/778,565, 12 [pages.

"Foreign Appeal Decision", Application Serial No. 2002-048648, (Mar. 24, 2009),6 pages.

"BPAI Decision", U.S. Appl. No. 09/802,504, (Feb. 11, 2009), 10 pages.

"Foreign Appeal Decision", Japanese Application No. 2002-048648, (Mar. 24, 2009), 17 pages.

"Non Final Office Action", U.S. Appl. No. 10/778,565, (Apr. 2, 2009), 10 pages.

"Non Final Office Action", U.S. Appl. No. 11/082,452, (Feb. 11, 2009), 6 pages.

Braun, John F., "Extract, Encode, and Tag an MP3 in One Step: N2MP3 Reviewed", Retrieved from: <http://www.macobserver.com/newreviews/bc/00/000225n2mp3/n2mp3.html> on 10/29/09 (Feb. 25, 2000), 5 pages.

Ghoualmi-Zine, et al., "Secured Net-BANKING by /spl theta/ -VIGENERE in Syverson's Protocol", ACS/IEEE 2005 International Conference on Computer Systems and Applications (AICCSA'05), (2005), 6 pages.

Shih, et al., "Real Time Incorporation of Personalized Audio into Video Game", U.S. Appl. No. 60/252,760, (Nov. 22, 2000), 14 pages.

"Final Office Action", U.S. Appl. No. 10/778,565, (Jun. 28, 2010), 15 pages.

"Final Office Action", U.S. Appl. No. 11/747,098, (Jul. 15, 2010), 8 pages.

"Restriction Requirement", U.S. Appl. No. 11/082,453, (Jul. 14, 2010), 6 pages.

"Winamp Player Overview", Retrieved from: <http://web.archive.org/web/19990428181707/winamp.com/winammp/overview.html> on Apr. 12, 2010, (1999), 3 pages.

Mcfedries, Paul "Complete Idiot's Guide to Windows 98", *Pearson Education, Inc.*, Second Edition,(1999), 3 pages.

O'Reilly, Tim et al., "Windows 98 in a Nutshell", O'Reilly & Associates, Inc., (1999), 3 pages.

Shih, et al., "Real Time Incorporation of Personalized Audio into Video Game", U.S. Appl. No. 60/201,163, (May 2, 2000), 13 pages.

\* cited by examiner

METHOD AND APPARATUS FOR MANAGING DATA IN A GAMING SYSTEM

RELATED APPLICATIONS

This application is a Divisional of co-pending application Ser. No. 09/802,797, filed Mar. 9, 2001, entitled "Method and Apparatus for Managing Data in a Gaming System", and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to gaming systems, and more particularly, to the managing of data stored on a disk drive or other storage devices in a gaming system.

BACKGROUND

Gaming systems currently available on the market are capable of playing game discs, music CDs, and movie DVDs from a disc drive. For example, the Playstation® 2 gaming system from Sony Corporation provides the ability to play games, music, and video titles from a disc inserted in the console. These gaming systems have limited internal data storage capacity. Typically, the internal data storage is used to store system and configuration information, such as the local time, the language preference of the user, and other settings. Other data, such as saved game data and other game-specific data, is generally stored on a memory device that is external to the game console. For example, memory units that are inserted into a handheld game controller store game information for later retrieval by a game console. Existing gaming systems do not contain an internal non-removable hard disk drive for storing saved games and other information.

Microsoft Corporation recently announced its Xbox™ video gaming system that is equipped with a hard disk drive to enhance gaming, and broadband connectivity to facilitate online gaming. With these additions, significant amounts of data (e.g., saved game data from multiple game titles and multiple users of the gaming system) can be stored within the video gaming system using the hard disk drive. This new internal storage capability creates new issues with respect to storing and segregating different types of data on the hard disk drive. Further, data associated with a particular game title should be protected from inadvertent or intentional corruption by another game title or application.

Accordingly, there is a need for an improved data handling mechanism for gaming systems that includes an internal data storage device, such as a hard disk drive.

SUMMARY

A gaming system includes a hard disk drive for storing various data. The gaming system applies a storage hierarchy to the hard disk drive to prevent unauthorized access to data stored on the hard disk drive. The hard disk drive is segregated into different logical regions such that each region stores a particular type of data and has specific data access policies. Each application that executes on the gaming system has a unique identifier and is provided with a separate area within certain regions for storing data related to the application. The separate areas provided for each application are based on the application's unique identifier. The gaming system also maintains a list of recently used nicknames to simplify user-entry of nicknames (e.g., a high-score entry for a game).

In the described implementation, the gaming system includes a game console and one or more controllers. The game console is equipped with a processor and a non-removable hard disk drive coupled to the processor. The game console may also include a memory, a portable media drive configured to communicate with a storage disc, one or more portable memory units, and broadband connectivity. In other implementations, the hard disk drive is configured to store game data, audio data, and video data.

A console application stored on the hard disk drive implements a user interface to allow user interaction with the gaming system. The game console boots into the console application upon power up or system reset. The console application also performs various functions necessary to operate the gaming system.

DETAILED DESCRIPTION

The method and apparatus described herein provides a hard disk storage hierarchy that is enforced to ensure proper storage of data and to prevent unauthorized access to stored data in a gaming system. The addition of a hard disk drive to a gaming system significantly increases the amount of data that can be stored within the gaming system. To manage this data, the hard disk drive's storage capacity is separated into different regions, where each region stores a particular type of data and has specific data access policies. The data access policies determine which applications are permitted to access a particular type of data. For example, a hard disk drive may contain a settings region, a user data region, an application data region, a utility region, and a console application region.

Each application that executes on the gaming system is provided with a separate area (such as a subdirectory) within the appropriate regions for storing data related to the application. Each application is restricted to viewing and accessing data in its own areas, thereby preventing accidental corruption of data associated with different applications. A console application is executed by the gaming system in addition to other applications (such as games, music applications, and movie applications). The console application performs various functions necessary to operate the gaming system, such as implementing a user interface, performing configuration operations, and performing various management functions. Console application data and configuration settings are stored in separate regions of the hard disk drive that are not generally accessible to applications other than the user interface application and configuration applications. The gaming system also stores recently used nicknames for entry in, for example, high-score listings. A user of the gaming system can select among the stored nicknames rather than entering the same name each time a game is launched or each time a high score is achieved.

Figure 1:
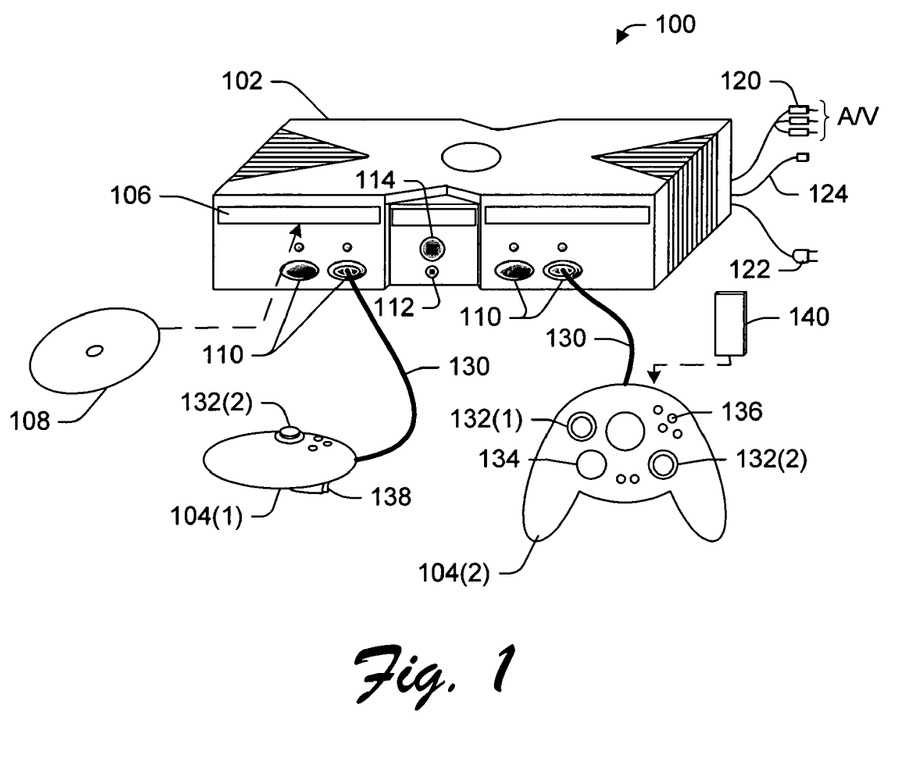
FIG. 1 illustrates an exemplary gaming system.

FIG. 1 shows an exemplary gaming system 100. The gaming system 100 includes a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be configured with broadband capabilities, as represented by the cable or modem connector 124 to facilitate access to a network, such as the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 or the game console 102 to provide additional and portable storage. Portable memory units enable users to store game parameters and port them for play on other consoles. For example, a user can save a game to a memory unit 140 using a particular game console then use that saved game data with a game executed on a different game console. In the described implementation, each controller is configured to accommodate two memory units 140, although more or less than two units may be employed in other implementations. A particular game console 102 may be configured to accommodate any number of memory units 140.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back include:

1. Game titles played from CD and DVD discs, from the hard disk drive, or from an online source.
2. Digital music played from a CD in the portable media drive 106, from a file on the hard disk drive (e.g., Windows Media Audio (WMA) format), or from online streaming sources.
3. Digital audio/video played from a DVD disc in the portable media drive 106, from a file on the hard disk drive (e.g., Active Streaming Format), or from online streaming sources.

Figure 2:
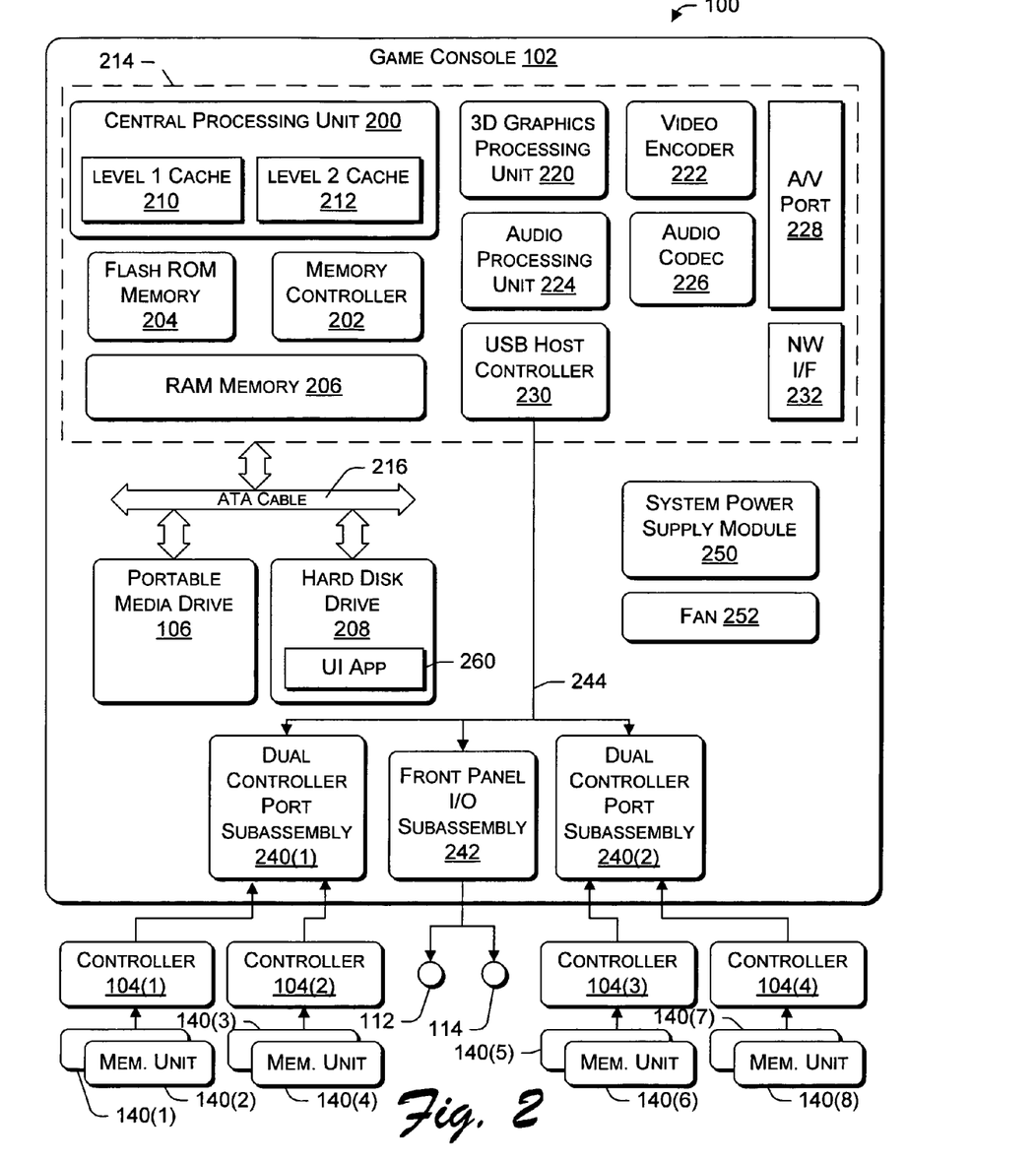
FIG. 2 is a block diagram of the gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., the Internet, home network, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202. Additionally, one or more memory units 140 may be inserted into game console 102 and accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console. Thus, the hard disk drive 208 (and the data stored thereon) is an important part of the initialization process. If the hard disk drive 208 is not functioning properly, the gaming system 100 may not boot successfully.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community.

Figure 3:
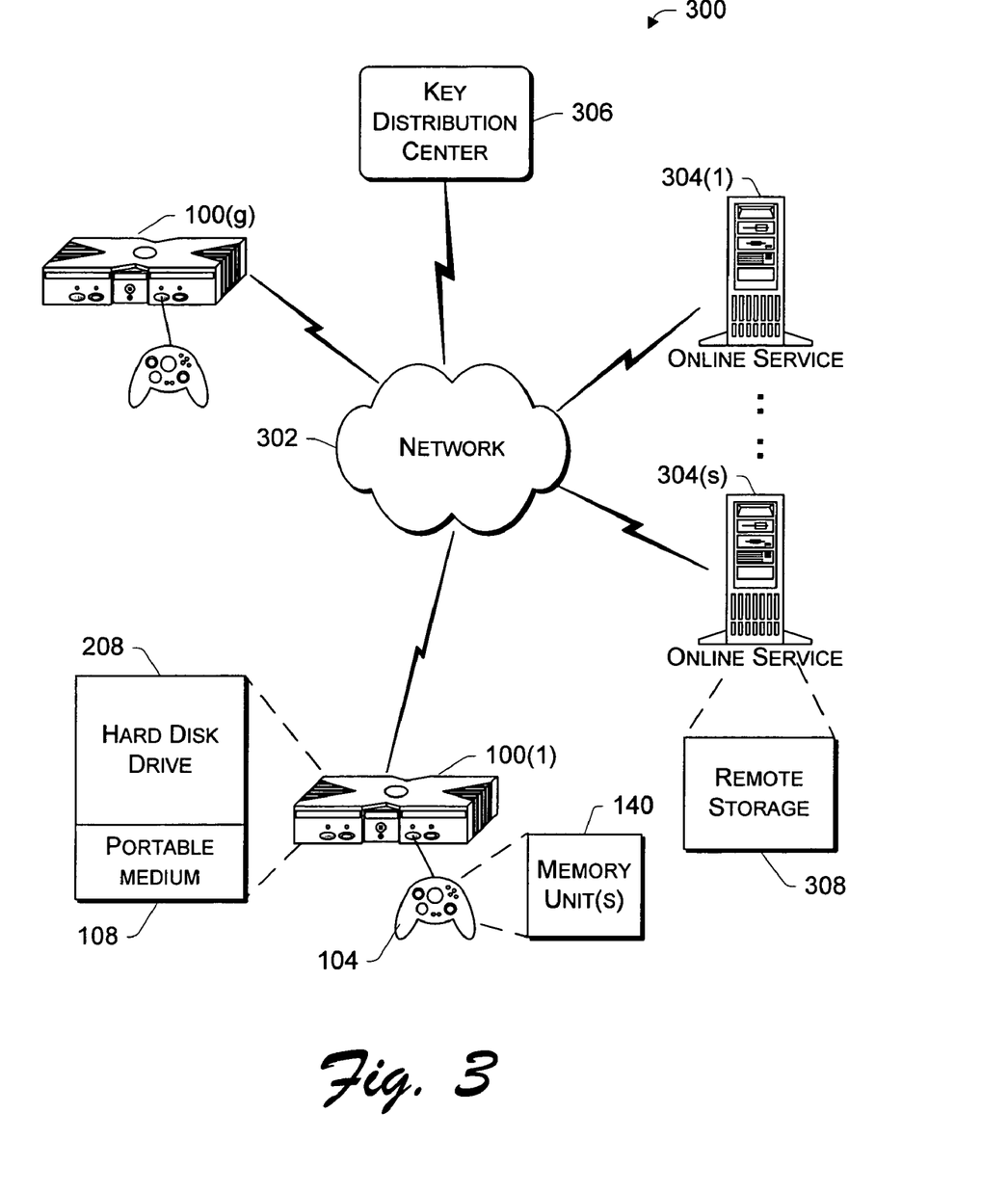
FIG. 3 illustrates a network gaming system in which the FIG. 1 gaming system is connected via a network to other consoles and services.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), . . . , 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Figure 4:
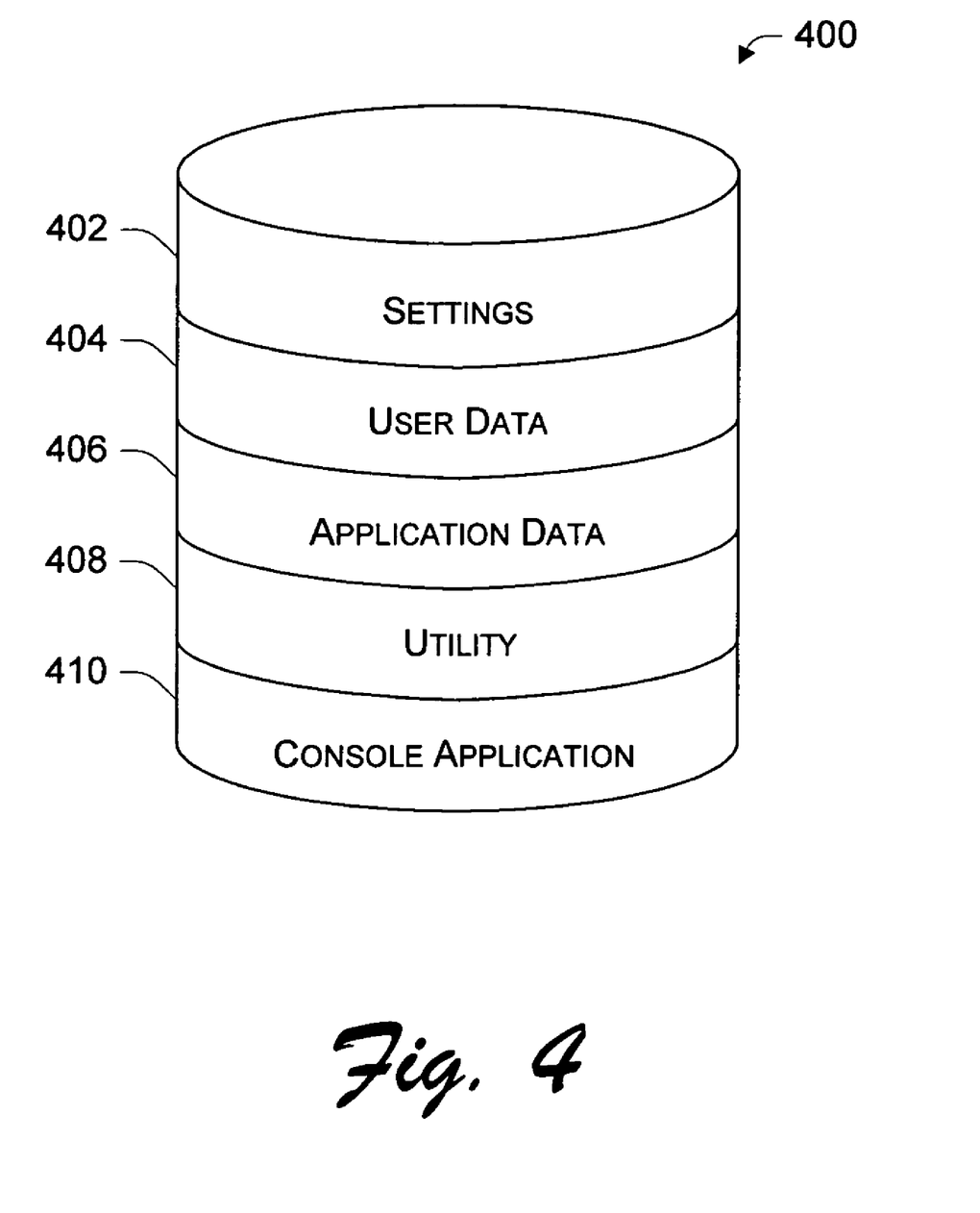
FIG. 4 illustrates an example hard disk drive containing five separate regions.

FIG. 4 illustrates an exemplary hard disk drive 400 containing five separate regions. In this example, the five hard disk drive regions are: a settings region 402, a user data region 404, an application data region 406, a utility region 408, and a console application region 410. The regions shown in FIG. 4 are provided as an example. In alternate implementations, a hard disk drive may contain any number of regions.

As discussed below, each region stores a particular type of data and has specific data access policies that restrict data access to those applications that are intended to access that type of data. The five regions represent a logical segregation of the hard disk drive and do not necessarily correspond to physical divisions or physical partitions of the hard disk drive. One or more applications (e.g., the console application) executed by the gaming system maintain and support this logical segregation of the hard disk drive into multiple regions.

The settings region 402 is used to store system state and configuration information used by the gaming system. Third-party applications (such as game applications, music applications and movie applications) are denied direct access to the settings region 402. Applications requiring data stored in the settings region 402 request such data through API (application program interface) calls. The storage space allocated to the settings region 402 is managed by the console application 260. The settings region data is stored outside the file system and is accessed using sector level input and output commands. This configuration reduces the risk of data corruption and undesired access to settings data. The settings region 402 is protected using a checksum to ensure that the settings data is not corrupted and, if necessary, can survive a complete system restoration procedure.

The user data region 404 is used to store user data on the gaming system. User data may include, for example, game data saved by a user of the gaming system or picture files saved by a user. The data in the user data region 404 is organized into a specific hierarchy. Applications are required to conform to this hierarchy. In one implementation, applications must conform to the specific hierarchy before the application is certified to execute on the gaming system. If the application is not certified to execute on the gaming system, the gaming system will reject any attempt to execute the application on the gaming system. Typically, the certification process is performed by the manufacturer of the gaming system.

In addition to storing user data in the user data region 404 of the hard disk drive 208, user data may also be stored in one or more memory units 140 (FIG. 1) is coupled to one or more controllers 104 or the game console 102.

The application data region 406 is used to store persistent data used by various applications that are executed by the gaming system. The data stored in the application data region 406 is created at various times during the execution of the application. This data is typically stored without the user's knowledge. The data stored in region 406 allows the application to maintain data across multiple game sessions without requiring the data to be associated with a particular saved game. In a particular implementation, music files (e.g., WMA files) are saved in the application data region.

Exemplary data stored in the application data region 406 includes updated player rosters, game updates, new game levels, skid marks on a road, damage to a building or object, or other changes that are maintained by the application. Skid marks and damage to a building are examples of "environmental changes" to the game that are applied each time the game is executed, including executing saved games. Each application is provided with a separate storage area (e.g., subdirectory) within the application data region 406 to store its application data. Generally, only the application that saved the specific data in the application data region 406 is permitted to delete that specific data. However, if a user of the gaming system indicates a desire to delete all data related to a particular application, the data in the application data region 406 associated with the particular application will be deleted.

In one implementation, the user data 404 and the application data 406 is stored in a single partition of the hard disk drive 400. This allows each application to use any portion of the data storage capacity provided by the partition. Each application uses a portion of the overall storage capacity of the partition. In this implementation, applications are not restricted to using a particular portion of the partition's total storage capacity. This configuration provides flexibility to the application (and the application developer) by allowing the application to use the amount of storage space desired. This configuration also reduces problems caused by limiting storage space allocated to each application. When applications are limited to a particular storage area, they may run out of storage space even though other applications are not using their entire storage allotment. Providing a single partition shared by all applications, reduces the likelihood that a particular application will not have sufficient storage space to execute properly.

The utility region 408 is used to store any data desired by the application. The utility region 408 can be used in any way by the application and the gaming system does not impose any restrictions on the use of the utility region by the application. Thus, each application is able to use its assigned utility region 408 in any manner that the application developer desires. Applications may use utility region 408 for caching data or creating a virtual memory space. The utility region 408 is for temporary storage of data. A particular application cannot be certain that the same data will be available the next time the application is executed.

In one implementation, three separate utility regions 408 are provided on the hard disk drive. Each utility region 408 contains 750 Megabytes of storage space and is used by a different application to store various data. When an application is launched, the gaming system determines whether one of the three utility regions 408 contains information stored by the same application during a previous execution of the application. If so, that same utility region 408 and the data previously stored by the application is assigned to the application for use during the current execution of the application. If none of the utility regions 408 contain information stored by the same application, the system determines whether one of the utility regions is empty. If so, the empty utility region is assigned to the application. Otherwise, the utility region with the oldest data is cleared (i.e., all data in the utility region is deleted) and assigned to the application for use during the current execution of the application.

When an application begins using one of the three utility regions 408, a timestamp is applied to the particular utility region being used. The timestamp identifies the application using the utility region 408 (e.g., the application title) and the time that the application accessed the utility region. The three utility regions 408 are aged out using a least recently used (LRU) algorithm. If an application is requesting a utility region 408, but all utility regions contain data, none of which is associated with the requesting application, then the LRU algorithm deletes the data from the utility region having the oldest timestamp. This automated process relieves the user (and the application developer) from managing this temporary storage space.

An application may identify whether it wants the data in the utility region 408 saved for future reference or deleted when the application is terminated. If the data is deleted, the utility region will be made available to another application. If the data is saved, the data will be available to the application the next time it is executed unless the LRU algorithm ages out the data stored in that utility region before the next execution of the application.

The console application region 410 is used to store various data used during execution of the console application, such as user interface data. Other applications are prevented from accessing the data stored in the console application region 410. In a particular implementation, the console application region 410 is stored in a separate partition of the hard disk drive 400 to reduce the likelihood that data stored in the console application region would become corrupted.

As shown in FIG. 4, various types of data are stored in the different regions of hard disk drive 400. However, other storage devices in the gaming system 100 may be restricted in the content they store. In one implementation, memory unit 140 is limited to storing saved game data associated with one or more games. Since the various gaming system settings and configuration data is specific to each gaming system, that data need not be distributed to other gaming systems (e.g., through portable memory unit 140). Instead, other gaming systems should rely on their own system settings and configuration data stored on their own hard disk drive or other internal storage device. Thus, when a user requests to save a game or other application data to memory unit 140, the data stored on the memory unit is limited to the data necessary to recreate the state of the game or other application at a later time. By limiting memory unit 140 to saving, for example, saved game data but no configuration data, the user is presented with a simple list of saved game data rather than a mixed list of saved game data and other configuration data that is not required by the user.

Figure 5:
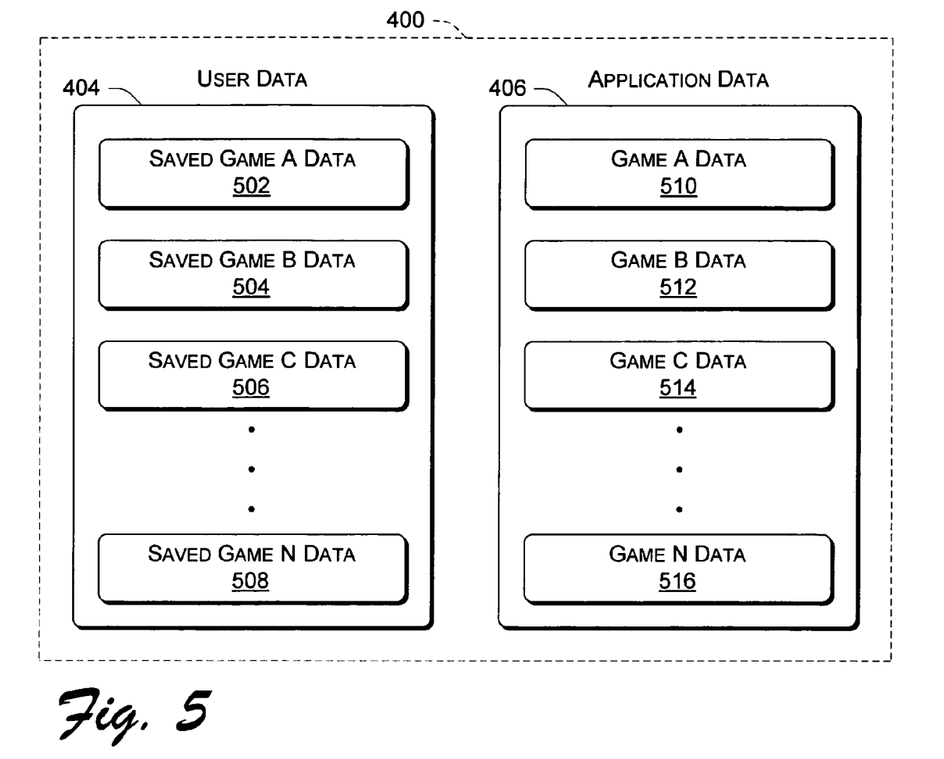
FIG. 5 illustrates exemplary data stored in two different regions of a hard disk drive.

FIG. 5 illustrates exemplary data stored in two different regions, user data region 404 and application data region 406, of hard disk drive 400. Each region of the disk drive may be further segregated into different sections or storage areas (e.g., subdirectories) that are associated with a particular application. This further segregation ensures that data associated with a particular application is not accessed or modified by another application, thereby maintaining the integrity of the data associated with each application that is executed by the gaming system.

In the example of FIG. 5, the user data region 404 and the application data region 406 store data related to multiple game applications (referred to as "Game A", "Game B", etc.). User data region 404 includes four sections, one for each game's saved data, labeled Saved Game A Data 502, Saved Game B Data 504, Saved Game C Data 506, and Saved Game N Data 508. A particular user data region 404 may contain any number of sections, each of which is associated with a particular game or other application. A particular application is permitted to access data associated with that application, but prevented from accessing or modifying data that is associated with a different application. For example, Game A can access data stored in section 502. However, Game A is prevented from accessing data stored in any of sections 504, 506, or 508 because that data is associated with a different game.

Application data region 406 includes four sections, one for each application's saved data, labeled Game A Data 510, Game B Data 512, Game C Data 514, and Game N Data 516. As discussed above, the application data region is used by applications to store persistent data generated by the application. A particular application data region 406 can contain any number of sections, each of which is associated with a particular game or other application. Each application is limited to accessing data from the section of region 406 that is associated with the application. For example, Game B can access Game B Data stored in section 512, but is prevented from accessing data in any of sections 510, 514, or 516 because that data is associated with a different game.

Figure 6:
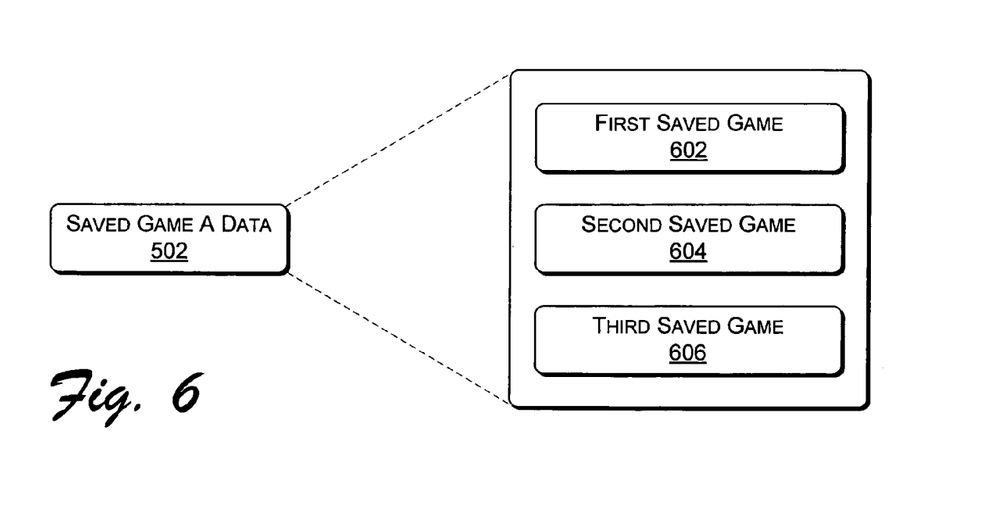
FIG. 6 illustrates exemplary saved game data stored in a user data region of a hard disk drive.

FIG. 6 illustrates exemplary saved game data 502 stored in the user data region 404 of hard disk drive 400. In this example, the saved game data 502 includes three sets of saved game data, labeled First Saved Game 602, Second Saved Game 604, and Third Saved Game 606. All three sets of saved game data 602-606 are related to the same game application (i.e., Game A). Each set of saved game data corresponds to a different "save game" command executed by a user of the gaming console. For example, each set of saved game data 602-606 may have been created on different days or created when the user of the gaming system reached a new level in the game. The saved game data 602-606 allows the user to restart the game application at the same location in the game (i.e., same game level, score, settings, etc.) as when the game was saved. A particular game application may create any number of sets of saved game data based on user requests to save the current state of the game. All saved game data related to a particular game (e.g., Game A) is stored in the same section (e.g., Saved Game A Data 502), which simplifies identification of the desired saved game.

Listed below are example directories used to store data on hard disk drive 400 in the gaming system. Similar directory structures can be used to store data on memory units 140 or other storage devices used by the gaming system.

ROOT\Udata\0FFFAB12 \FFE62<saved game files>
ROOT\Udata\0FFFAB12 \F4B1A\<saved game files>
ROOT\Tdata \0FFFAB12 \<saved data>

The first two directories identified above store various saved game data files for a particular game application. The "Udata" directory off from the root represents the user data region 404 of the hard disk drive 400. The next entry "0FFFAB12" is a subdirectory of the user data region 404, and is associated with a particular application. In this example, "0FFFAB12" represents the hash of the title of a game. Each game should generate a different hash value such that each subdirectory is unique. Alternatively, a unique game identifier may be used as the subdirectory name.

The next entries "FFE62" and "F4B1A" each represent a particular saved game subdirectory. Various data files associated with each saved game are stored in each subdirectory. A new subdirectory is created each time the user of the gaming system initiates a save game operation. The new subdirectory stores the various saved game data generated by that save game operation. The entries "FFE62" and "F4B1A" are generated by hashing various information about the saved game (such as the name of the saved game, the date the game was saved, the time the game was saved, or the game level when the game was saved). In one implementation, the entries "FFE62" and "F4B1A" are generated by hashing the name of the saved game. Alternatively a combined date and time code may be used to generate unique subdirectory names.

The third directory identified above stores additional data related to the game "0FFFAB12". The "Tdata" directory off from the root represents the application data region 406 of the hard disk drive 400. Since the data stored in the application data region 406 generally applies to the game itself and not to particular saved games, there are no subdirectories off from "0FFFAB12".

A new subdirectory is created under "Udata", and "Tdata" each time a new application is executed by the gaming system. When an application is executed, the gaming system first checks for existing subdirectories associated with the application. If subdirectories already exist for the application, those subdirectories, and their corresponding data, are assigned to the application. However, if no subdirectories exist for the application, the console application creates the appropriate subdirectories for the application to use.

Although many different subdirectories may extend from "Udata" and "Tdata", a particular application only sees data and subdirectories contained under the application's particular subdirectory. Thus, the application is unable to see the entire directory structure or identify other applications that have associated subdirectories stored on the hard disk drive. These restrictions on data access prevent an application from intentionally or inadvertently corrupting data associated with another application.

In certain situations, the gaming system may allow an application to access data associated with a different application. For example, if a new version of an application is released, it may generate a different identifier than the previous version of the application, and thus be associated with a different set of subdirectories. In this example, the gaming system (e.g., the console application) can map or redirect the new version of the application to the subdirectories associated with the old version of the application, thereby allowing the new version of the application to access data stored by the old version of, the application.

In another example, an application from a particular manufacturer may be permitted to access data associated with a different application from the same manufacturer. In this example, the manufacturer is given the responsibility of properly handling the data generated by its applications.

Figure 7:
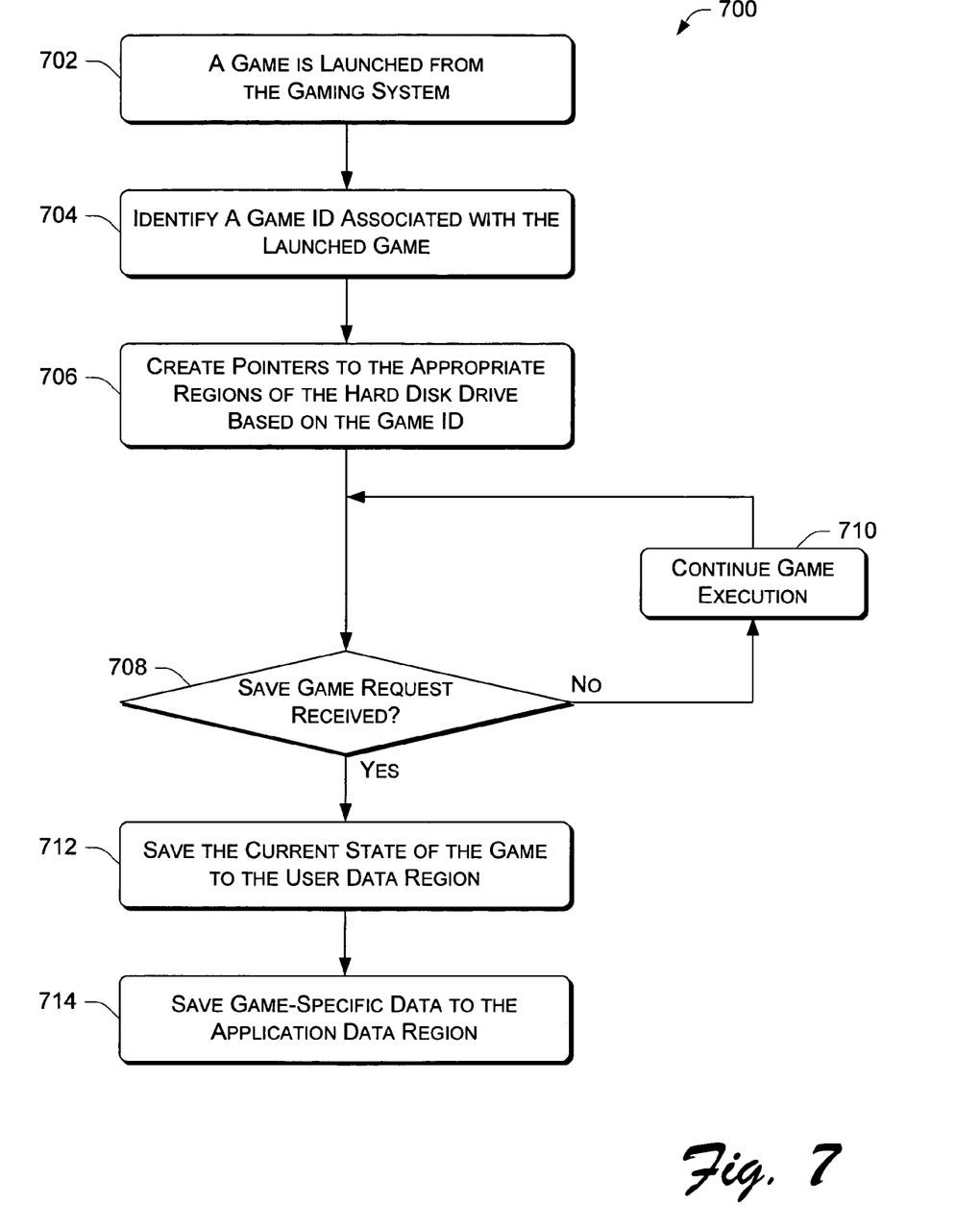
FIG. 7 is a flow diagram of a process that stores game-related data in appropriate regions of a hard disk drive.

FIG. 7 is a flow diagram of a process 700 that stores game-related data in appropriate regions of a hard disk drive. The process 700 is implemented in software as computer-executable instructions that are executed by the CPU 200 to perform the operations illustrated as blocks. Initially, a game is launched from the gaming system (block 702). A game can be launched by inserting a game disc into portable media drive 106, selecting a game (or a saved game) from the hard disk drive 108 (via a user interface that identifies saved games), selecting a saved game from a memory unit 140, or selecting a game from an online source.

Next, the process 700 identifies a Game ID associated with the launched game (block 704). The Game ID is used by the gaming system to distinguish one game from another and ensure that different games access the appropriate sets of data from the hard disk drive 208 and other storage devices. In one implementation, the Game ID is assigned by the manufacturer of the gaming system to ensure that all Game IDs are unique. In another implementation, the Game ID is generated by creating a hash of the game title.

At block 706, the process 700 creates pointers or other mechanisms to identify the appropriate regions of the hard disk drive based on the Game ID. For example, a particular game may be permitted to access a particular portion of the user data region and a particular portion of the application data region. The pointers direct the application to the appropriate portions of the user data region and the application data region, but do not allow access to portions of the user data region and the application data region that are associated with different games. A particular pointer may identify particular subdirectories on the hard disk drive, as discussed above.

The process 700 then determines whether a user of the gaming system has requested that the current game be saved on the hard disk drive (block 708). If the user has not requested to save the current game, execution of the game continues (block 710). If the user has requested that the current game be saved, the process saves the current state of the game as a set of data in the user data region of the hard disk drive (block 712). Additionally, other game-related data may be stored to the application data region of the hard disk drive (block 714). Although the saving of other game-related data is shown at block 714, such activity can occur at any point during the execution of the game. For example, if a car hits the wall of a race track during a race, the game may record the skid marks and damage to the wall in the application data region of the hard disk drive. Thus, the same skid marks and damage to the wall will be shown in the future when the same game is executed on the gaming system.

Figure 8:
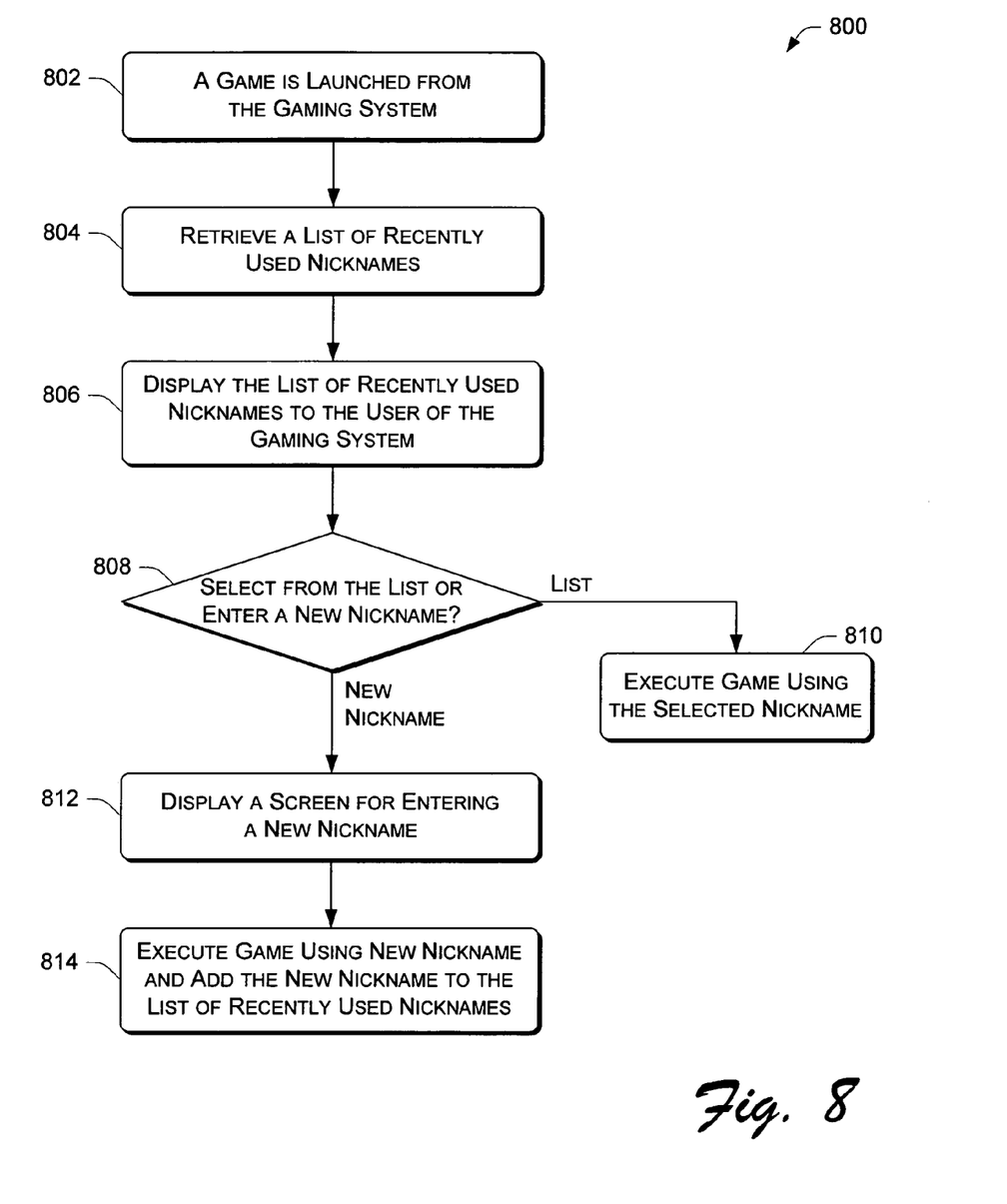
FIG. 8 is a flow diagram of a process that manages various nicknames entered by users of the gaming system.

FIG. 8 is a flow diagram of a process 800 that manages various nicknames entered by users of the gaming system. The process 800 is implemented in software as computer-executable instructions that are executed by the CPU 200 to perform the operations illustrated as blocks. Nicknames are often used to assign names to characters in a game or to identify a user's high score. Initially, a game is launched from the gaming system (block 802). The process 800 retrieves a list of recently used nicknames (block 804). The list may be ordered such that nicknames recently used with the current game are displayed first, and nicknames used recently with other games are displayed later in the list. Next, the process displays the list of recently used nicknames to the user of the gaming system (block 806). The user of the gaming system is then presented with the opportunity to select a nickname from the displayed list or create a new nickname for use in the current game. The process 800 determines whether the user selects a name from the nickname list or selects to enter a new nickname (block 808). If the user selected a name from the nickname list, the process branches to block 810, where the game is executed using the selected nickname. If the user selected entering a new nickname, the process continues to block 812, where the procedure displays a screen for entering a new nickname. After the user enters a new nickname, the process 800 executes the game using the new nickname and adds the new nickname to the list of recently used nicknames (block 814). If a high-score is achieved (or any other action requiring entry of the player's nickname), the selected nickname is automatically entered as the default name. The user is able to change the default name if they choose.

Figure 9:
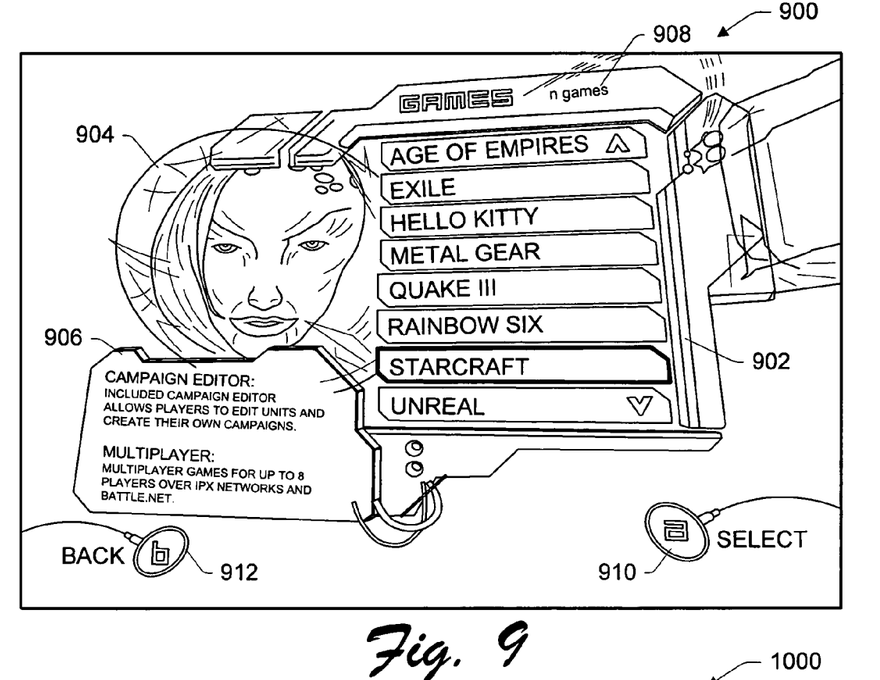
FIG. 9 illustrates a graphical user interface depicting an exemplary game selection menu.

FIG. 9 illustrates a graphical user interface 900 depicting an exemplary game selection menu. The graphical user interface 900 is generated by the console application 260 executed by the CPU 200. The game selection menu is the area where the user can select from available game applications they have previously played on their gaming system. Although this example lists available games, similar user interfaces identify other types of applications, such as an audio player or a video player. The user interface 900 includes a list 902 of the games available on the gaming system. A game is an application that has been purchased, borrowed, or rented by the user and played on their gaming system at least one time. In FIG. 9, the games are shown in horizontal tiles or panes. It is noted that other graphical themes may be alternatively used to represent available games, such as a bookshelf, a toy box, or the like.

The user interface 900 also includes an orb 904 depicting an image of the currently selected game title and a text panel 906 with information about the selected game. In the illustrated example, the game "Starcraft" is highlighted, resulting in an image of a character from the game "Starcraft" being depicted in orb 904 and information pertaining to this game being presented in text panel 906. The game developer is given control of the contents of the orb 904 and text panel 906, so the information will vary from one game to another.

A piece of descriptive text 908 (i.e., "n games") is positioned beside the main legend "Games" to indicate the number of games in the list. The list 902 displays a limited number of games (e.g., eight titles). When a user first enters the games collection after purchasing their gaming system, there will be zero titles in the list 902. To represent this, the descriptive text 908 states "0 games" and the text panel 906 offers a short statement telling the user that future games played on the console will appear in this area. As the user plays games, they are added to the list 902. When the descriptive text 908 indicates that there are more games than shown on list 902 (e.g., n>8), up/down scroll arrows are added to the list 902 to indicate that there are additional titles not currently shown on the list.

As noted above, the game developer provides the data used to fill the orb 904 and text panel 906. When the user plays a game on the gaming system for the first time, a number of data elements are copied into the application data region of the hard disk drive 208 for use by the application during future executions of the application.

The user can move among games in list 902 by using the up and down directions of the thumbstick, or some other predefined control mechanism. The list 902 may be configured to wrap or not wrap when the user reaches the top or the bottom of the list. A select element 910 allows the user to select the highlighted game from list 902 using the "A" button on the controller. A back element 912 facilitates navigation back to the previous menu in the user interface. The back element 912 is chosen by pressing the "B" button on the controller, as visually aided by the letter "b" in the element 912.

Figure 10:
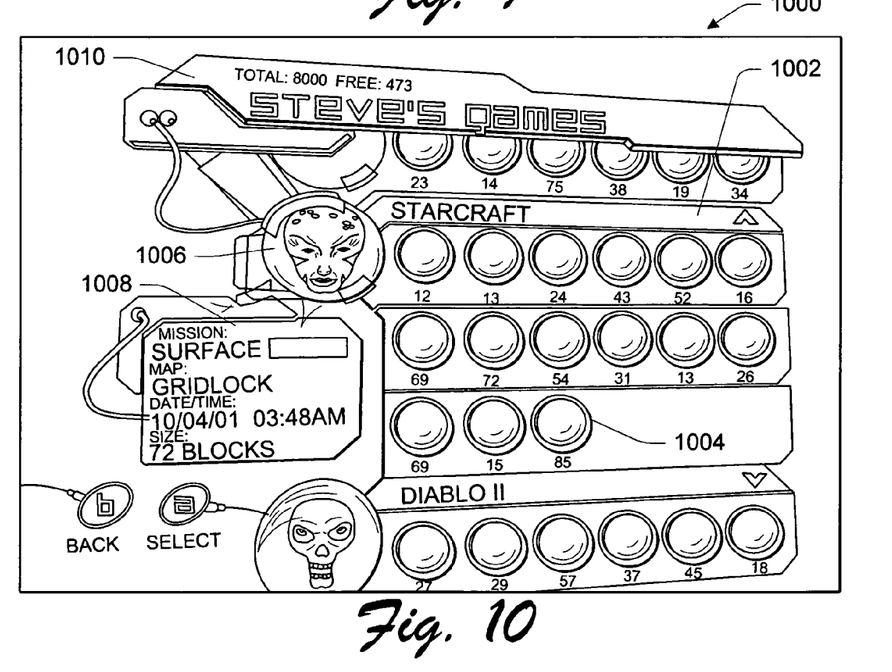
FIG. 10 illustrates a graphical user interface depicting an example display of information related to saved games.

FIG. 10 illustrates a graphical user interface 1000 depicting an example display of information related to saved games. The user interface 1000 provides a view of all content data that is currently available on the selected memory device, such as the hard disk drive. The user interface 1000 depicts a flat list 1002 of games and their corresponding saved games, soundtracks and their associated tracks, and video clips that are stored on the selected memory device. Each file is represented by small orbs 1004 arranged in horizontal panes. Each orb has an image that identifies the contents, such as a game image or the last scene before the game was saved. The file 1004 has an associated number that denotes the total size of the saved game in blocks.

In the games context, the list of files 1002 is formatted such that the game graphic is situated in an orb 1006 located near the title of the game title (e.g., "Starcraft"). The orb 1006 is selectable and upon selection, performs a multi-select on all of the saved games for the selected game. Each saved game is selectable as well by navigating to the desired orb 1004. As before, navigation can be achieved by using the left, right, up, and down directions of the thumbstick, or other mechanism. In one implementation, the saved game orbs 1004 are sorted by most recently saved within each game entry.

A text panel 1008 offers a richer description of the saved game, audio track, or video clip that is currently focused. In the game context, this description might include the following information:

Saved Game
    2D image associated with the saved game
    Game that the saved game belongs to
    Saved game name
    The location (e.g., level) in the game or current mission
    Date and Time the game was saved
    Total size of the saved game
Multiple Saved Games
    Generic image representing multiple saved games
    Total size of all of the currently selected saved games
Game Title
    2D image associated with the game
    Name of the game
    Total number of saved games
    Total size in blocks of the game (sum of saved games, persistent data, etc.)

In one implementation, game developers provide certain information relating to each saved game such that the user of the gaming system can easily identify the saved game they want to play or copy onto another storage device, such as memory unit 140. An example of the information that a particular application may save when a save game command is executed might include:

Name of the game associated with the saved game data
A graphic representation of the location in the game when saved
A brief description of the game state when saved (e.g., Level 3—At the Castle Entrance)
Date and time the game was saved In other implementations, more or less data may be saved in response to a save game command.

In a particular implementation, the gaming system requires the game developer to use a descriptive name when saving a game. A descriptive name is something other than, for example, "save.001" or "savegame.b". Instead, a descriptive name requires, for example, an identification of the game that created the saved game file and some type of information relating to the status of the game and/or the date and time the game was saved. To accommodate this descriptive name, game developers are permitted to create saved game names of any character length and saved game names can use any characters (including symbols, punctuation, etc.). Providing descriptive names with saved games allows the user of the gaming system to easily locate the desired saved game.

A top title pane 1010 provides summary information, such as a friendly name of the storage device (e.g., "Steve's Games"), the memory device's total storage space in blocks, and the memory device's storage space left in blocks. Select and back elements support navigation to other screens.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method, comprising:
retrieving, by a game console, a list of recently used nicknames from a storage device in a game controller, at least one nickname being associated with multiple different game applications;
displaying, responsive to a signal from the game console, the list of recently used nicknames retrieved from the storage device in the game controller by displaying first in the list any nicknames used with a current game application and then displaying next in the list any nicknames used with other game applications;
receiving, by the game console, a selected nickname that is selected from the list of recently used nicknames;
retrieving, by the game console, authentication data from the storage device in the game controller, the authentication data being associated with the selected nickname and a user;
communicating the authentication data to a key distribution center to authenticate an identity of the user to join the game console with a network gaming environment; and
executing, by the game console, a game application associated with the selected nickname when the identity of the user is authenticated.

2. A method as recited in claim 1 wherein retrieving the list of recently used nicknames includes retrieving the list of recently used nicknames from a non-removable hard disk drive in the game console.

3. A method as recited in claim 1, further comprising:
receiving, at the game console, a newly created nickname; and
executing, by the game console, the game application associated with the newly created nickname.

4. A method as recited in claim 1, further comprising:
receiving, at the game console, a newly created nickname; and
adding, by the game console, the newly created nickname to the list of recently used nicknames.

5. A method as recited in claim 1, further comprising automatically entering, by the game console, the selected nickname into a high score display.

6. A method as recited in claim 1, wherein the selected nickname identifies at least one of a high score or a character in the game application associated with the selected nickname.

7. A method as recited in claim 1, further comprising entering, by the game console, a recently used nickname as a default name when a high score is achieved.

8. A game console, comprising:
one or more storage media; and
one or more processing units coupled to the one or more storage media, the one or more processing units configured to:
retrieve a collection of nicknames from a memory unit coupled to a game controller, each nickname being associated with multiple different games, wherein the collection of nicknames is displayed as a list of nicknames with nicknames recently used with a current game displayed first in the list and nicknames recently used with other games being displayed next in the list;
receive a selected nickname that is selected from the collection of nicknames;
retrieve authentication data from the memory unit coupled to the game controller, the authentication data being associated with a user and the nickname;

communicate the authentication data to a distribution center to authenticate an identity of the user to join the game console with a network gaming environment; and execute a game associated with the selected nickname when the identity of the user is authenticated.

9. The game console as recited in claim 8, wherein the one or more processing units are further configured to:

receive a newly created nickname; and execute the game associated with the newly created nickname.

10. The game console as recited in claim 8, wherein the one or more processing units are further configured to:

receive a newly created nickname; and add the newly created nickname to the collection of nicknames.

11. The game console as recited in claim 8, wherein the one or more processing units are further configured to enter the selected nickname into a high score display.

12. The game console as recited in claim 8, wherein the one or more processing units are further configured to use the selected nickname as a default name when a high score is achieved.

13. The method as recited in claim 1 further comprising initiating a new game application, wherein the selected nickname is automatically associated with the new game application.

* * * * *